(12) United States Patent
Scofield et al.

(10) Patent No.: US 8,104,044 B1
(45) Date of Patent: Jan. 24, 2012

(54) SYSTEM AND METHOD FOR CLIENT-SIDE WIDGET COMMUNICATION

(75) Inventors: Christopher L. Scofield, Seattle, WA (US); Brad E. Marshall, Bainbridge Island, WA (US); Elmore Eugene Pope, Sammamish, WA (US); Eric B. Merritt, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 1211 days.

(21) Appl. No.: 11/831,644

(22) Filed: Jul. 31, 2007

(51) Int. Cl.
*G06F 9/44* (2006.01)
*G06F 15/16* (2006.01)

(52) U.S. Cl. ........................................ 719/313; 709/203

(58) Field of Classification Search .................. 719/310, 719/313, 315, 328; 709/201, 203
See application file for complete search history.

(56) References Cited

U.S. PATENT DOCUMENTS

| | | | | |
|---|---|---|---|---|
| 6,469,714 B2* | 10/2002 | Buxton et al. | ................ | 715/762 |
| 7,269,792 B2* | 9/2007 | Consolatti et al. | ............ | 715/749 |
| 7,546,543 B2* | 6/2009 | Louch et al. | ................ | 715/762 |
| 7,707,514 B2* | 4/2010 | Forstall et al. | ................ | 715/810 |
| 7,873,908 B1* | 1/2011 | Varanasi et al. | ............... | 715/763 |
| 7,873,910 B2* | 1/2011 | Chaudhri et al. | ............. | 715/764 |
| 2002/0078255 A1* | 6/2002 | Narayan | ........................ | 709/316 |
| 2004/0216042 A1* | 10/2004 | Consolatti et al. | ............ | 715/513 |
| 2006/0106859 A1 | 5/2006 | Eugene et al. | | |
| 2007/0038934 A1* | 2/2007 | Fellman | ........................ | 715/700 |
| 2007/0061486 A1 | 3/2007 | Trinh et al. | | |
| 2007/0061724 A1 | 3/2007 | Slothouber et al. | | |
| 2007/0162850 A1* | 7/2007 | Adler et al. | .................. | 715/700 |
| 2007/0209013 A1* | 9/2007 | Ramsey et al. | ............... | 715/769 |
| 2008/0307220 A1* | 12/2008 | Campbell | ..................... | 713/155 |

OTHER PUBLICATIONS

Braiker, "Tech: Welcome, year of the widget," Newsweek, Dec. 30, 2006, 2 pages.
MacManus, "Widgets are the new black," http://www.readwriteweb.com/archives/widgets_are_the.php, Jun. 23, 2006, 5 pages.

* cited by examiner

*Primary Examiner* — Van Nguyen
(74) *Attorney, Agent, or Firm* — Robert C. Kowert; Meyertons, Hood, Kivlin, Kowert & Goetzel, P.C.

(57) ABSTRACT

Method and system for client-side communication among widgets. In one embodiment, instructions may be processor-executable within a system to implement a web browser and a number of widgets configured to execute within an execution environment provided by the web browser. The web browser may be configured to obtain content from servers external to the system, and members of at least a subset of the widgets may be configured to communicate with one another without interacting with any of the external servers.

53 Claims, 6 Drawing Sheets

SYSTEM AND METHOD FOR CLIENT-SIDE WIDGET COMMUNICATION

BACKGROUND OF THE INVENTION

1. Field of the Invention

This invention relates to computer-retrieved content, and more particularly to mechanisms for facilitating client-side communications among widgets that interact with computer-retrieved content.

2. Description of the Related Art

The Internet, sometimes called simply "the Net," is a worldwide system of computer networks in which a client at any one computer may, with permission, obtain information from any other computer. The most widely used part of the Internet is the World Wide Web, often abbreviated "WWW," which is commonly referred to as "the web." The web may be defined as all the resources (e.g., web pages and web sites) and users on the Internet that use the Hypertext Transfer Protocol (HTTP) or variations thereof to access the resources. A web site is a related collection of web files that includes a beginning file called a home page. From the home page, the user may navigate to other web pages on the web site. A web server program is a program that, using the client/server model and HTTP, serves the files that form the web pages of a web site to the web users, whose computers contain HTTP client programs (e.g., web browsers) that forward requests and display responses. A web server program may host one or more web sites.

In some instances, web pages may include widgets that may be configured to retrieve content from web servers or other sources and display or otherwise present the retrieved content to a user. Widgets may be configured to perform some degree of client-side processing of the retrieved data. Typically, widgets correspond to individual modules of code that may execute independently of one another. Web-based content that supports widgets may allow users to tune or customize their experience with the content, for example by replacing supplied widgets with other versions that may provide different functionality.

SUMMARY

Various embodiments of a method and system for client-side communication among widgets are disclosed. In one embodiment, instructions may be processor-executable within a system to implement a web browser and a number of widgets configured to execute within an execution environment provided by the web browser. The web browser may be configured to obtain content from servers external to the system, and members of at least a subset of the widgets may be configured to communicate with one another without interacting with any of the external servers.

In one particular implementation, the instructions may be further executable to implement a message bus that is configured to receive a message from a given widget and to broadcast the message to other widgets. Delivery of the message may occur without interaction with any of the servers external to the system and without interaction with the web browser to access a content model of the content maintained by the web browser.

In another particular implementation, the instructions may be further executable to implement a registry configured to maintain a representation of interfaces of widgets that have registered with the registry.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Widget Overview

The client-server model for browsing computer-delivered content is ubiquitous. In typical implementations of this model, such as the version illustrated in FIG. 1, a user may interact with browser software executing on a client system 10 (alternatively, client 10). Via network 20, client system 10 may communicate (e.g., in response to a user command detected by the browser software) with a server system 30 (alternatively, server 30) that is configured to provide some type of content. In response to content requests, server 30 may return content to client 10 for display to the user via the browser software.

Figure 1:
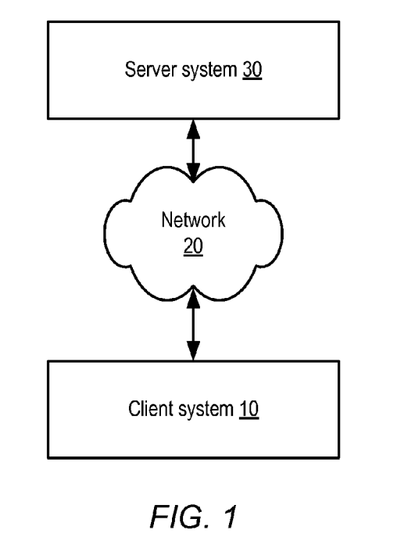
FIG. 1 is a block diagram illustrating one embodiment of a client-server model for browsing computer-delivered content.

In various embodiments, client 10 may correspond to a personal computer (e.g., a desktop or notebook computer supporting an operating system such as Microsoft Windows™, Apple MacOS™, Linux or another suitable operating system), to a mobile computing device such as a personal digital assistant (PDA) or mobile phone, or to any other device suitable for user interaction. In various embodiments, server 30 may correspond to any suitable type of system configured to provide content in response to requests received from clients 10 on behalf of their users. For example, server 30 may be configured as a web server that provides web pages (e.g., formatted according to Hypertext Markup Language (HTML) or another suitable format), as a server of audio, still image, video or other types of data, and/or as a server of code executable by client 10.

Network 20 may be implemented using any suitable wired or wireless communication technology. For example, in various embodiments network 20 may include wired or wireless Ethernet local area network (LAN) technology (e.g., compliant with IEEE 802.3 or 802.11 standards, respectively), data protocols for use with mobile telephony (e.g., compliant with the High-Speed Downlink Packet Access (HSPDA) protocol, the Evolution-Data Optimized (EV-DO) standard, the Enhanced Data Rates for GSM Evolution (EDGE) standard, or another suitable protocol), wide-area networks (WANs), or other suitable technology for data exchange between client 10 and server 30. In some embodiments, network 20 may encompass portions of the public Internet, while in other embodiments, network 20 may be entirely private to an enterprise (e.g., as a private "intranet").

In one embodiment, the browser software executable by client 10 may be configured as a web browser. Broadly speaking, a web browser may encompass an application executable to retrieve and display web pages from a web site located on the World Wide Web (e.g., accessible via the public Internet) or on a local or private network (e.g., accessible via an enterprise intranet). Web pages may include text, visual data, audio data, hyperlinks to other web pages or content, or other types of data. Typically, to retrieve a web page for display to a user, a web browser may use a protocol such as Hypertext Transfer Protocol (HTTP) to access a Uniform Resource Locator (URL) that specifies the web page to be retrieved. However, it is contemplated that other types of transport protocols and resource identifiers may be employed. Some examples of web browsers include Microsoft Internet Explorer™, Mozilla Firefox™, Safari™, and Opera™, though other examples exist.

In a client-server system such as that shown in FIG. 1, it may be desirable to allow code obtained from a server 30 to execute within an execution environment provided by a browser executing on client 10. Allowing content obtained from a server to actively execute, rather than be only passively displayed, may allow for more robust, sophisticated user experiences and may improve performance. For example, a server 30 may deliver client-executable code in addition to other content in order to offload various content management or display tasks to the client 10. Such offloading may result in improved use of the bandwidth provided by network 20 and may permit different users to customize the ways in which they interact with similar content obtained from a server 30.

In one embodiment, a web browser executing on client 10 may provide an execution environment in which widgets obtained from other sources, such as server 30, may execute. Along with more passive types of data, widgets may be a form of content that may be obtained by a browser executing on client 10. Generally speaking, a widget may be a self-contained executable code module. In one embodiment, a widget may be embedded or installed within other content displayed by a web browser and may be configured to execute on client 10 to implement some function. Typically, widgets may be obtained, installed and executed within a web browser on a client 10 without requiring a separate, user-visible compilation and/or linking step, as is common for standalone application code. Widgets may also be referred to as badges, chunks or modules. In some instances, a widget that is configured to execute within an execution environment provided by a web browser may be referred to as a "browser widget" or "web widget." As described in greater detail below, in some embodiments, widgets such as "desktop widgets" may be configured to execute independently of a web browser or other application.

Widgets may be implemented using any of a variety of suitable technologies or combinations thereof. In various embodiments, widgets may be implemented in HTML or in various types of coding or scripting languages such as Java™, Javascript, Flash™, C#, PHP, or perl, for example and without limitation. In some embodiments, widgets may be implemented within more sophisticated content development environments. For example, widgets may be implemented using AJAX (Asynchronous Javascript and XML) techniques or other similar techniques. Broadly speaking, widgets may be configurable to execute on client 10 in order to provide a user interface to content that is active or dynamic, rather than static. For example, a widget may be included within a web page displayed via a browser along with other content. In one embodiment, the widget may be operable to dynamically refresh or change the content it displays to the user, without requiring that the entire web page be refreshed or reloaded. For example, a widget may be operable to stream dynamic content such as video or audio. A widget may also be operable to update (e.g., from a server 30) and display to the user (e.g., via a web browser) content that changes frequently, such as news headlines, weather data, financial market data, for example. In one embodiment, widgets or badges may be configured to present interest data to users regarding content sources users may be interested in visiting. Further details regarding such widgets or badges may be found in U.S. patent application Ser. No. 11/478,919, entitled "Method And System For Displaying Interest Space User Communities," filed Jun. 30, 2006, which is hereby incorporated by reference in its entirety.

Widgets may be broadly categorized or classified according to the relationship(s) they have with the content with which they interact. In one embodiment, a widget may have one or more of three primary relationships with content, in a manner roughly analogous to the Model-View-Controller software architecture paradigm. First, it may function as a data source. That is, a widget may store and/or generate content, for example to be provided to other widgets for processing. Second, a widget may function to display content, for example to a user via a user interface. Third, a widget may be configured to modify or transform content, for example by converting, aggregating, or otherwise processing received content. It is noted that a given widget may exhibit more than one of these relationships. In some embodiments, individual widgets configured to perform different functions may be composed into a single, more complex widget. For example, such composition may be performed by a content user employing the various techniques described below, or by a content designer.

Figure 2:
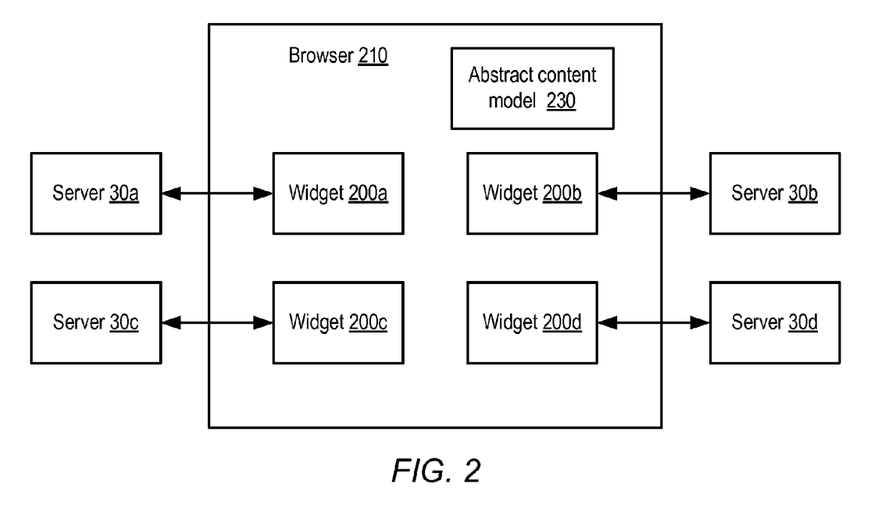
FIG. 2 is a block diagram illustrating one embodiment of a client system including widgets.

FIG. 2 illustrates one embodiment of a client 10 on which a number of different widgets 200*a-d* (collectively, widgets 200) are configured to execute within a web browser 210 (or simply, browser 210). Browser 210 may be any suitable type of browser configured to retrieve and display content to a user via client 10, such as any of the commercial web browsers mentioned previously, or a proprietary or custom browser. In the illustrated embodiment, each of widgets 200*a-d* is configured to communicate with a respective server 30*a-d*. For example, widgets 200 may communicate with corresponding servers 30 via network 20 (not shown in FIG. 2). Typically, each widget 200 corresponds to some dedicated, lightweight functionality or task. As such, each widget 200 may be configured to communicate only with servers 30 compatible with its function, and may not be capable of communicating with the servers 30 that support other types of widgets 200. For example, a widget 200 that supports playback of streaming video may be configured to communicate with a corresponding video server 30, but not with a server 30 that supplies real-time stock market quotations to a widget 200 configured to display such quotations. It is noted that any number of widgets 200 and corresponding servers 30 may be employed, and that in other embodiments, additional instances of client 10 including their own instances of widgets 200 may also be configured to communicate with servers 30.

In some embodiments, it is contemplated that various ones of widgets 200 may be configured to communicate with other widgets 200 executing on different clients 10 instead of or in addition to communicating with corresponding servers 30. For example, two different instances of similar widgets 200 that are executing on two different clients 10 may be configured to communicate with one another in a peer-to-peer fashion. In some instances, such communication may occur without intervention on the part of a server 30.

In the embodiment shown in FIG. 2, widgets 200 may not be able to communicate with one another within client 10. That is, widgets 200 may not be configured to exchange information in a manner that does not require the intervention of servers 30 or browser 210. For example, in the illustrated embodiment, for widgets 200*a-b* to be able to communicate with one another, it may be the case that each widget 200*a-b* must communicate with its respective server 30*a-b*. Communication path 250 illustrates one example of such indirect, server-side communication between widgets. Along this path, widget 200*a* may send a message to its server 30*a*, which conveys the message to server 30*b*. In turn, server 30*b* may convey the message to widget 200*b* within client 10.

In some embodiments, browser 210 may be configured to mediate communication between widgets 200*c-d* via abstract data model 230. Generally speaking, abstract data model 230 may correspond to a representation, maintained by browser 210, of a document or page of content retrieved by browser 210 for display. Such a representation may be a hierarchical tree, set of records or any other suitable data structure that browser 210 may manipulate in order to render the content for display to s user and to process the user's interactions with the content. For example, abstract data model 230 may conform to a version of the Document Object Model (DOM) standard promulgated or recommended by the World Wide Web Consortium (W3C), such as any of DOM Levels 0-3. Other techniques for parsing content and generating a corresponding model 230 may also be employed, however, such as Streaming API for XML (SAX), Virtual Token Descriptor for XML (VTD-XML), or other suitable techniques. To communicate via abstract data model 230, in one embodiment widget 200*c* may be configured to modify the state of an element stored within the data model 230 that has been exposed to widget 200*c* by browser 210. Widget 200*d* may then be configured to access the modified element within the data model 230 and thereby retrieve information communicated from widget 200*c*. To simplify presentation, abstract data model 230 may be omitted from other illustrations including browser 210, though it may be present in the illustrated embodiments.

The aforementioned techniques for implementing communication between widgets 200 may suffer from various limitations, however. For example, implementing intra-widget communication via server-side techniques such as communication path 250 may require several communication transactions among what may be bandwidth-constrained paths (particularly the communication paths between client 10 and servers 30). This may considerably increase the latency of communication relative to the proximity of widgets 200 to one another within client 10. Moreover, communication path 250 may require that servers 30 have some degree of awareness of the widgets 200 each serves and the clients 10 on which the widgets 200 are located, so that servers 30 can communicate on the widgets' behalf. This may increase the complexity of coordinating and configuring servers 30, especially in situations where different servers 30 are deployed by different enterprises to support different types of content.

In the case where widgets 200 communicate via abstract data model 230, the indirection of communicating via the browser 210 that generates and manages the data model 230 may introduce additional complexity to the design of browser 210 and overhead in the communication path between widgets 200. Such a configuration may also limit the flexibility with which users can customize and/or reconfigure the widgets 200 they prefer to use. For example, data model 230 may generally be derived from the content of the overall page or object within which widgets 200 are included. Correspondingly, it may be necessary that the data model 230 reflect the widgets 200 that are configured to communicate through it. That is, it may be necessary for the content designer to anticipate and support the types of widgets 200 that a user might wish to include within a page, which may limit the extent to which users are free to perform their own client-side customization of widgets 200.

Client-Side Communication Between Widgets

Figure 3:
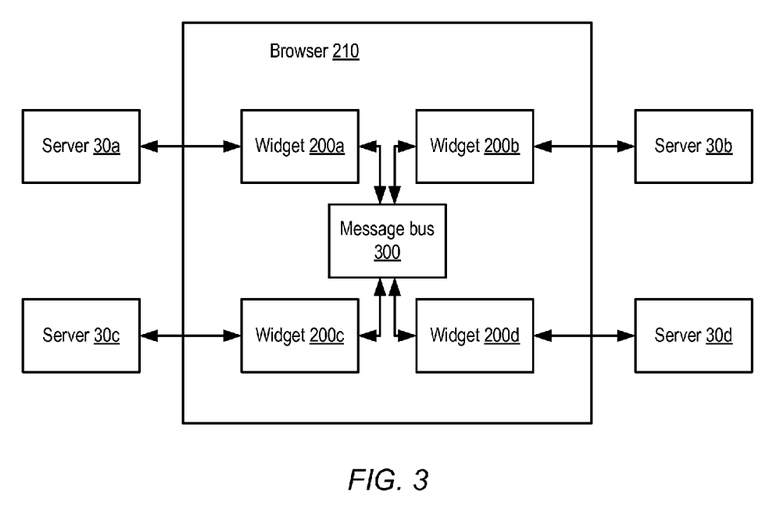
FIG. 3 is a block diagram illustrating one embodiment in which a number of widgets may communicate via a shared message bus.

FIG. 3 illustrates one embodiment in which widgets 200 may be configured to communicate with one another without interacting with any of servers 30. In some embodiments, widgets 200 may also be configured to communicate with one another without interacting with browser 210 to access an abstract data model 230. In the illustrated embodiment, widgets 200*a-d* may be configured to communicate with one another via a shared message bus 300. In one embodiment, message bus 300 may be implemented as a code module within the context of a page or other content being rendered by browser 210. For example, message bus 300 may be implemented as a collection of functions implemented in Javascript or another coding technology. In some instances, message bus 300 may be functionally analogous to a widget 200 configured for the specific purpose of facilitating message broadcast among other widgets 200. That is, message bus 300 may be implemented independently of abstract data model 230 within browser 210. In other embodiments, it is contemplated that message bus 300 may be implemented via abstract data model 230. For example, message bus 300 may be implemented through manipulation of the browser-managed DOM or other content model.

Message bus 300 may be configured to implement a set of functions callable by widgets 200. In one embodiment, these functions may include a registerWidget( ) function, a registerListener( )function, and a sendMessage( )function, though in other embodiments, message bus 300 may support different types of functions. In one embodiment, the registerWidget( ) function may take a parameter that uniquely identifies a particular widget 200 to message bus 300, and the registerListener( ) function may take a parameter that identifies a function to be called by message bus 300 when the message bus 300 receives a message from a widget 200. The sendMessage( ) function may take a parameter that defines a message to be conveyed from a widget 200 to other widgets 200 that have been registered via the registerListener( ) function.

Figure 4A:
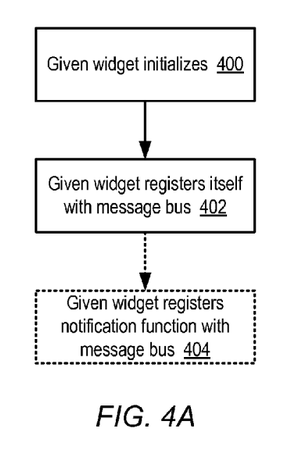
FIGS. 4A-B are flow diagrams illustrating respective embodiments of a methods of widget registration and communication via a message bus.
Figure 4B:
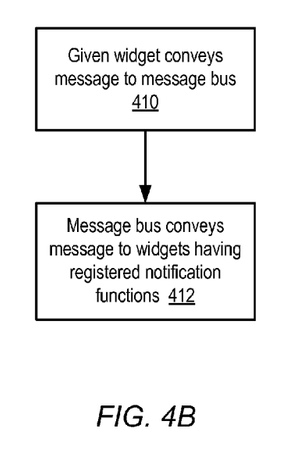

Example embodiments of methods of widget registration and message bus 300 operation are illustrated in FIGS. 4A-B. In FIG. 4A, operation begins in block 400 in which a given widget 200 initializes itself. For example, the given widget 200 may begin operating upon being installed within a page displayed by browser 210, upon a page within which the given widget 200 is located being retrieved from a server 30, or under any other suitable startup condition. Following initialization, the given widget 200 may register itself with message bus 300 (block 402). For example, the given widget 200 may call the message bus's registerWidget( ) function or another suitable function.

Optionally, the given widget 200 may also register a notification function with message bus 300 (block 404). For example, the given widget 200 may call the message bus's registerListener( ) function or another suitable function to specify to message bus 300 the manner in which the given widget 200 should receive messages that have been transmitted to the message bus 300 (e.g., by other widgets 200), such as by providing the name of a callback function or other notification method. This element is optional, in that in some instances, a given widget 200 may be configured only to deliver messages to message bus 300 and may elect not to receive any messages delivered by other widgets 200. In other embodiments, widget registration and registration of a notification function may be combined, for example via a single function call to message bus 300.

In one embodiment, message bus 300 may be configured to employ separate Javascript arrays to track the registered widgets 200 and registered notification functions generated through the above process, though in other embodiments message bus 300 may employ any suitable data representation.

FIG. 4B illustrates one embodiment of the operation of message bus 300 in the transmission of messages among widgets 300. Operation begins in block 410 where a given widget 200 conveys a message to message bus 300. For example, the given widget 200 may invoke the message bus's sendMessage( ) function and may supply a message as a parameter. In some embodiments, when it receives a message from a given widget 200, message bus 300 may be configured to determine whether the given widget 200 was previously registered (e.g., according to FIG. 4A) or is otherwise known to message bus 300. If the given widget 200 is unregistered or otherwise unknown, message bus 300 may abort the message, respond to the given widget 200 with an error condition, or take other responsive action. In other embodiments, message bus 300 may not qualify message receipt against the registration status of the sending widget 200.

After receiving the message from the given widget 200, message bus 300 may convey the message to those widgets 200 that have registered corresponding notification functions (block 412). In some embodiments, message bus 300 may be configured to implement internal queuing of messages, for example to decouple message receipt from message delivery and allow for variations in the rates at which each occurs. Also, in some embodiments message bus 300 may be configured to deliver multiple messages to various widgets 200 concurrently.

In some embodiments, message bus 300 may be configured to unconditionally convey messages received from any given widget 200 to those widgets 200 that have registered corresponding notification functions. In such embodiments, it may be left to the recipient widgets 200 to determine whether or not they have any use for the message received. In other embodiments, message bus 300 may be configured to perform some degree of conditional delivery, for example by delivering a message to a widget 200 contingent on some aspect of the message content.

Any suitable data format may be employed to encode the messages transmitted among widgets 200 via message bus 300. In various embodiments, the message may take the form of a document encoded in eXtensible Markup Language (XML), HTML, Javascript Object Notation (JSON) or another suitable data format or representation. In one embodiment, the message may include header or envelope information that may aid recipient widgets 200 in processing the message. For example, such header information may include the name of the widget 200 that generated the message, a reference to the specific instance of the generating widget 200 (e.g., an identifier or pointer), and information identifying the general content or format of the message (e.g., according to a schema common to the registered widgets 200). A recipient widget 200 may use such header information to determine whether it should continue to receive and/or process the inbound message. If a recipient widget 200 determines on the basis of header information that it has no interest in a particular message, it may abort processing of that message.

In one embodiment, a given widget 200 may be configured to broadcast messages to other widgets 200 via message bus 300 without any expectation of a response to be generated by the message. That is, the message may be a unidirectional notification of some information regarding the given widget 200, rather than a request for information. In other embodiments, a given widget 200 may be configured to broadcast a request message to other widgets 200 with the expectation of a response. That is, widgets 200 may implement a request/response protocol via the broadcast delivery of messages provided by message bus 300. In some embodiments, when employing request/response-type messages, a given widget 200 may also employ a timeout or other feature to prevent deadlock if no suitable response is received after a reasonable time.

The communication architecture supported by message bus 300 may enable a number of widgets 200 to communicate with one another with low latency and without considerable configuration overhead. For example, using message bus 300, it may be unnecessary for widgets 200 or a user to perform extensive discovery regarding what other types of widgets 200 are available, what sort of messages they can generate, and what sort of messages they can receive. Instead, once widgets 200 have suitably registered with message bus 300, they may start broadcasting messages to any available widgets 200 without dependence on whether the messages are usefully received by any other widgets 200 or not. That is, in one embodiment of the message bus architecture, after registration, widgets 200 may simply "start talking" to message bus 300 regarding their operational state. If other widgets 200 are present for which these messages are meaningful, they may respond appropriately upon receiving them. Otherwise, the messages may simply be discarded.

One example illustrating how a variety of widgets 200 might interact via message bus 300 is as follows. Referring once again to FIG. 3, in one embodiment widget 200a may be configured to retrieve streaming audio data from audio feed server 30a, and to play back the audio via system resources available on client 10. For example, widget 200a may present a user interface through which a user may interactively select audio to be played, or may provide a playlist of items to be retrieved and played in some order or randomly.

Widget 200b may be configured to retrieve and display image data corresponding to a particular audio item from image server 30*b*. For example, in response to receiving the name of a song, album, artist or other identifying information, widget 200*b* may be configured to retrieve album cover art or other imagery and to display the imagery to the user via client 10.

Widget 200*c* may be configured to share a user's current activity status with respect to client 10 with members of that user's virtual community as indicated via messaging server 30*c*. For example, in response to being presented with the name of an audio item and status information indicating that the referenced item is currently playing, widget 200*c* may be configured to present the name of the item to members of the user's instant messaging (IM) chat group via server 200*c*, or to another type of virtual community, as an indication of the user's current status.

Finally, widget 200*d* may be configured to retrieve item pricing and/or availability status information from an e-commerce merchant server 30*d*. For example, in response to receiving the name of a song or album, widget 200*d* may be configured to look up the price of the song or album for delivery as a digital download or as physical media, and may display this information to a user via client 10.

In one embodiment, each of widgets 200*a-d* may register with message bus 300 and through it may interoperate as follows. When widget 200*a* begins playing a new song (e.g., in response to a user's selection or a playlist), it may convey a message including identifying information regarding the song to message bus 300. For example, the message may include the name of the song, the artist, the name of the album, the label, and/or other types of information. Message bus 300 may then broadcast the message to each of widgets 200*b-d*. In response to receiving the message, widget 200*b* may contact server 30*b* to retrieve suitable cover art corresponding to the currently playing song, and may display it to the user via client 10. When widget 200*c* receives the message, it may responsively update the user's status as presented to other users via messaging server 30*c*, for example so that the user's friends are informed about what the user is currently listening to. Finally, in response to receiving the message, widget 200*d* may retrieve pricing information for the corresponding download or album from merchant server 30*d* and may correspondingly display this information to the user, possibly along with a link or other feature that allows the user to initiate a purchase via merchant server 30*d*.

Thus, as just described, widgets 200*a-d* may be configured to interoperate via messages distributed via message bus 300 in order to provide a multifaceted, integrated user experience. It is noted that widgets 200*a-d* may achieve such communication with one another entirely by passing messages via client 10. That is, communication among widgets 200*a-d* may occur without directly involving any of servers 30*a-d*. Such communication may also occur without widgets 200*a-d* interacting with an abstract data model of the displayed content maintained by browser 210. Also, it is noted that modularity among widgets 200 is preserved by the communication model provided by message bus 300. For example, if a user decides that the image art displayed by widget 200*b* is unsatisfactory, the user may elect to replace widget 200*b* with a different widget 200 that is configured to source image content from a different server 30. Alternatively, the user may simply disable widget 200*b* without replacing it. In either case, the modification need not affect the operation of the other widgets 200.

In some instances, widgets 200 may be configured to communicate with specific other widgets 200 without necessarily broadcasting messages to all available widgets 200 as described above. For example, in one embodiment widget 200*a* may be configured to convey a message that is specifically targeted to widget 200*b*, such that other widgets 200 either do not receive or do not process the message. Such a communication model may be referred to as a peer-to-peer model, in contrast to the broadcast-type model described above.

Figure 5:
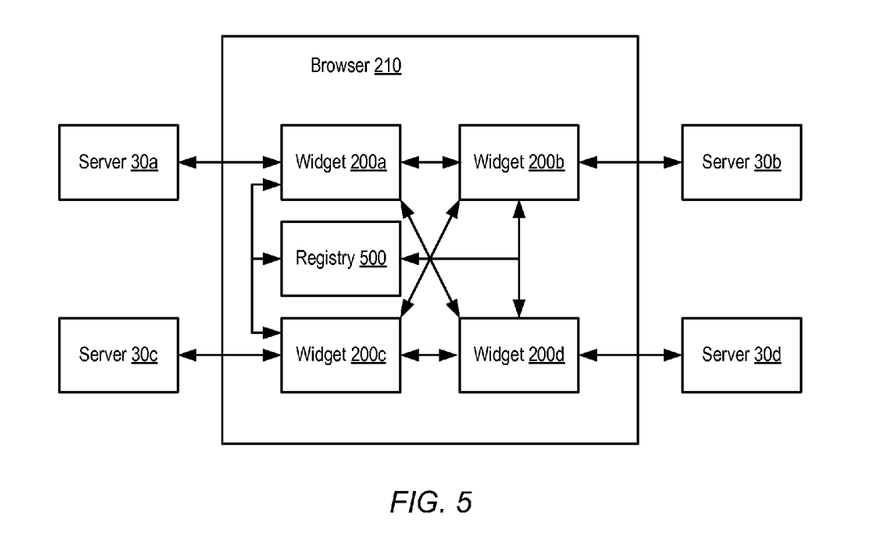
FIG. 5 is a block diagram illustrating one embodiment in which a registry is configured to facilitate communication among a number of widgets.

One embodiment in which widgets 200 may be configured to communicate according to a peer-to-peer model is illustrated in FIG. 5. In the illustrated embodiment, widgets 200, browser 210 and servers 30 may be similar to those described above with respect to FIG. 3. However, in the embodiment of FIG. 5, widgets 200 may be configured to communicate with a registry 500 and may also be configured to communicate with one another in a peer-to-peer fashion as described below. In one embodiment, registry 500 may be configured as a data structure that stores information indicating which widgets 200 are present as well as the types of information each widget 200 can provide and/or consume (e.g., to/from other widgets 200). Like message bus 300, in various embodiments registry 500 may be implemented as a collection of functions and data structures coded in Javascript or using any other suitable implementation technology. Similarly to message bus 300, in various embodiments, registry 500 may be implemented independently of abstract data model 230 or in conjunction with it (e.g., via manipulation of DOM elements). It is noted that while bidirectional communication among widgets 200 is shown in FIG. 5, in some embodiments only unidirectional communication may be implemented between certain ones of widgets 200.

Broadly speaking, registry 500 may function as a clearinghouse of data on widget interfacing through which a user or automated functionality may discover how various widgets 200 may be capable of communicating with one another. The user or automated functionality may then use such interface information to instruct various widgets 200 to communicate with particular peers, in a manner analogous to "wiring" or "connecting" particular widgets 200 together for communication purposes. That is, registry 500 may be configured to support the creation of virtual peer-to-peer connections among widgets 200.

Figure 6A:
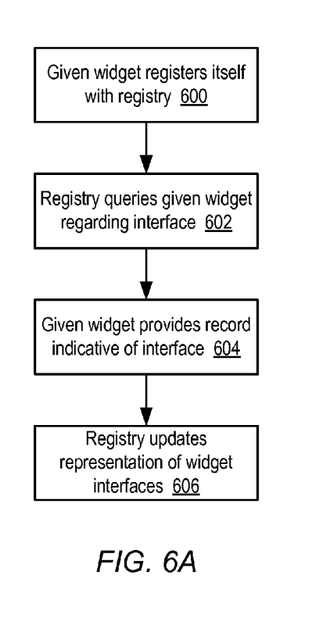
FIG. 6A is a flow diagram illustrating one embodiment of a method of widget registration with a registry for peer-to-peer communication.

One embodiment of a method through which registry 500 may register widgets 200 for peer-to-peer communication is illustrated in FIG. 6A. In the illustrated embodiment, operation begins in block 600 where a given widget 200 registers itself with registry 500. For example, the given widget 200 may call a function exposed by registry 500 as part of an API, in a manner similar to that described above with respect to the API that may be provided by message bus 300. In some embodiments, the given widget 200 may register itself upon its initialization, for example as described above with respect to FIG. 4A.

Registry 500 may then query the given widget 200 regarding its interface (block 602). For example, in one embodiment, widgets 200 may support a common scheme, such as a common function call, through which they may be configured to provide information regarding the types of messages they may generate and/or receive. In response to querying by the registry 500, the given widget 200 may provide a record indicative of its interface (block 604). In various embodiments, the given widget 200 may provide such a record in any suitable format, for example as a document or message formatted according to HTML, XML, JSON or any other suitable protocol.

Widgets 200 may specify their interfaces by referring to a common schema, for example, by indicating that they generate or respond to messages that conform to particular definitions for format and content that are known to registry 500 and to other widgets 200 that support the common schema. In other embodiments, widgets 200 may explicitly enumerate the format(s) of the message(s) they generate and/or respond to, such as by employing a description language or metalanguage to indicate the structure and expected content of such messages. For example, referring to the streaming audio example discussed above, in one embodiment an audio widget 200a may be configured to generate messages indicative of a currently playing song title and may not respond to any input messages. Correspondingly, in one embodiment widget 200a may be configured to specify its interface by indicating that it generates a SongTitle message that conforms to a standard schema. Alternatively, widget 200a may be configured to specify its interface by generating a message that describes the format of the SongTitle message in some detail. For example, widget 200a may generate a message that reflects the various fields of the message, the manner in which they are delimited (e.g., using XML tags or other conventions), and the type of data each represents (e.g., numeric, textual, Boolean, etc.). Other techniques for describing the interface of a widget 200 are possible and contemplated. Also, it is contemplated that in some embodiments, the given widget 200 may be configured to provide such a record upon its initial registration with registry 500, for example as a parameter of the registration request, rather than in response to a specific query by registry 500.

Upon receiving a record indicative of the interface of the given widget 200, registry 500 may be configured to update a representation of interfaces of registered widgets 200 to reflect the given widget's interface (block 606). For example, in one embodiment, registry 500 may be configured to maintain a representation of the registered widgets 200 as a graph. Nodes of the graph may correspond to respective registered widgets 200, and directed edges of the graph may correspond to possible communication paths between pairs of widgets 200. For example, for a given directed edge of the graph, the source node may correspond to a widget 200 that is configured to generate a particular type of message, and the destination node may correspond to a widget that is configured to receive that particular type of message. To generate such a graph, registry 500 may be configured to examine the records provided by widgets 200. For example, registry 500 may search for records of different widgets 200 that specify common message schemas, or registry 500 may perform a more thorough parsing of the detailed interface descriptions provided by widgets 200. In various embodiments, registry 500 may be configured to store the generated graph or other representation of the interfaces of registered widgets 200 within one or more tables, arrays or other suitable data structures.

Figure 6B:
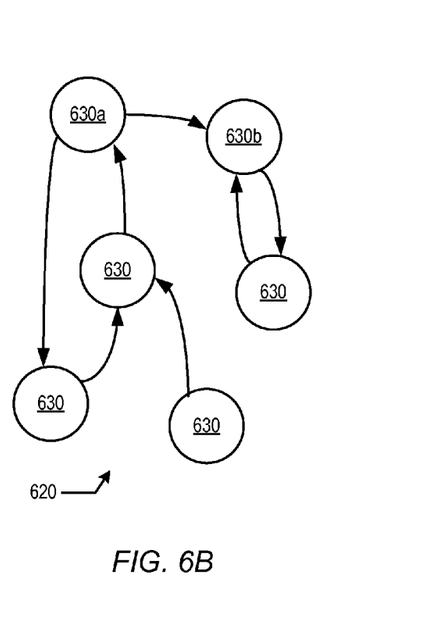
FIG. 6B illustrates one embodiment of a representation of a graph that may be generated by a registry to reflect registered widgets.

One embodiment of a representation of a graph that may be maintained by registry 500 is illustrated in FIG. 6B. In the illustrated embodiment, graph 620 includes a number of nodes 630 interconnected by directed edges. Each node 630 may correspond to a respective one of registered widgets 200. Each directed edge may correspond to a respective pair of nodes 630, including a source node 630 from which the edge originates and a destination node at which the edge terminates. In one embodiment, each directed edge of graph 620 may be indicative of a corresponding communication path or message type between widgets 200 that correspond to the nodes 630 connected by the directed edge. For example, if a widget 200a is capable of conveying a particular message type and a widget 200b is capable of receiving that message type, graph 620 may indicate this relationship via a directed edge between nodes 630a-b, which correspond respectively to nodes 200a-b. It is noted that a source node 630 with respect to one edge may be a destination node 630 with respect to another edge.

Figure 7:
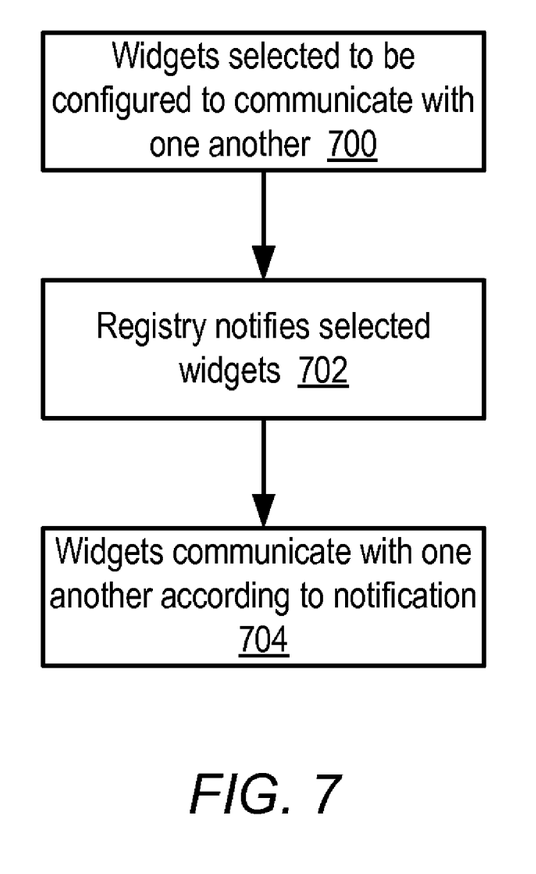
FIG. 7 is a flow diagram illustrating one embodiment of a method of configuring widgets for peer-to-peer communication via a registry.

The graph or other representation of interfaces of registered widgets 200, as maintained by registry 500, may be indicative of the possible communication paths that may be established among widgets 200. That is, such a representation may indicate possible valid configurations in which one widget 200 may generate messages that other widget(s) 200 may receive and react to. In one embodiment, configuration of widgets 200 to actually communicate with one another according to the interface data indicated by registry 500 may be performed separately from the process of registration described above. FIG. 7 illustrates one embodiment of such a method of configuration, as may be implemented by registry 500, for example.

Operation of the illustrated embodiment begins in block 700 where two or more widgets 200 are selected to be configured to communicate with one another. For example, in one embodiment, registry 500 may be configured to display the graph or other representation of registered widgets 200 to a user of client 10 via an interactive interface. The user may then select several widgets 200 from the display, for example through mouse gestures, keyboard input or other appropriate input. In another embodiment, registry 500 may be configured to automatically select widgets 200 without user input, for example as part of an automatic configuration routine. In some embodiments, selection of widgets 200 may be constrained by whether the selected widgets 200 can validly communicate with one another according to the representation maintained by registry 500. For example, registry 500 may prevent a user or an automated process from selecting a widget 200 that cannot be interfaced with other selected widgets 200.

After two or more widgets have been selected, registry 500 may notify the selected widgets 200 (block 702). In one embodiment, to perform this notification, registry 500 may convey messages to each of the selected widgets 200 that indicate the identities of each of the selected widgets 200 as well as the types of messages to be exchanged among the selected widgets 200. Generally speaking, the notification may include whatever information is necessary and sufficient to enable at least one of the selected widgets 200 to convey messages to one or more other selected widgets 200. For example, the notification may include an identifier, pointer or address corresponding to a widget 200 that should receive messages from the notified widget, the name of a function call that may be used to convey a message to a recipient widget 200, or any other suitable notification information.

Subsequent to receiving the notification, the selected widgets 200 may communicate with one another according to the selected configuration as indicated by the notification (block 704). For example, a first widget 200 may be capable of generating three types of messages, denoted A, B and C, while a second widget 200 may be capable of receiving and processing two types of messages, C and D. The first widget may be notified that when it generates C-type messages, it should convey them specifically to the second widget 200.

Considering the streaming audio example once again in the context of the peer-to-peer communication model just described, in one embodiment a user may wish to install a customized version of a cover art widget 200b to replace an existing version of the widget. In one embodiment, upon registering the new cover art widget 200b with registry 500 (e.g., by downloading the new widget) the user may be presented with an opportunity to configure the existing widgets 200 available on a given page within browser 210. Using any suitable interface technique (e.g., point and click, click and drag, etc.) the user may indicate that the existing streaming audio widget 200a should be configured to convey song title messages to the new cover art widget 200b. Once appropriately notified, audio widget 200a may convey messages to the new cover art widget 200b when changes to the currently playing audio stream occur, allowing the new cover art widget 200b to display appropriate corresponding imagery.

It is contemplated that using variations of the above-described peer-to-peer interfacing techniques, users of widgets 200 may be able to customize their configuration and behavior, thus tailoring their experiences according to their needs or tastes. In some embodiments, it is further contemplated that such techniques may allow other automated functionality, such as registry 500, to automatically configure and manage the behavior of collections of widgets 200 without requiring user intervention.

In the above discussion, widgets have been described as executing within an environment provided by a browser 210. In other embodiments, it is contemplated that widgets may be configured to execute independently of a browser 210. For example, in one embodiment, widgets may be configured to execute as free-standing applications within a desktop environment provided by an operating system such as Microsoft Windows™ or Apple MacOS™. Such widgets may be referred to as desktop widgets, in contrast to web widgets configured to execute within a browser's environment. In such embodiments, it is contemplated that the broadcast communication features facilitated by a suitable variant of message bus 300, or the peer-to-peer communication features facilitated by a suitable variant of registry 500, may be employed to implement client-side communication among desktop widgets in a manner to that described above for web widgets.

Figure 8A:
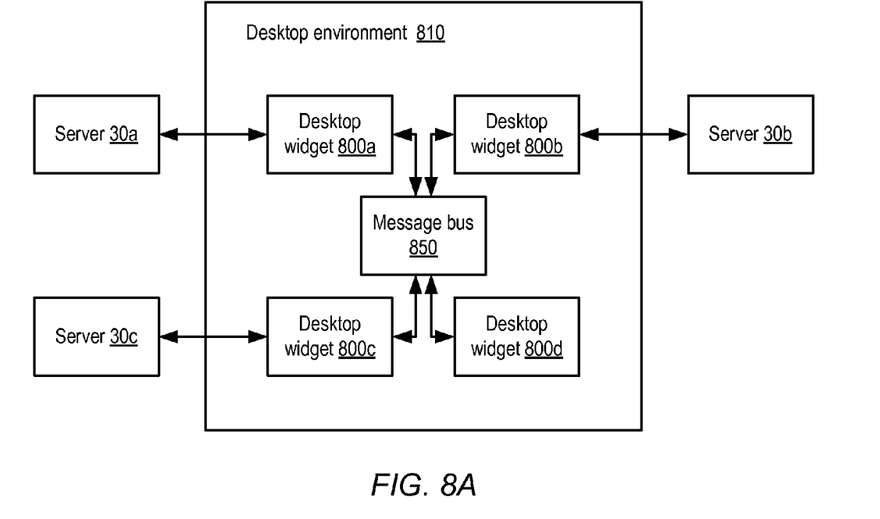
FIGS. 8A-B are block diagrams illustrating respective embodiments of desktop widgets configured to communicate via a message bus or via a registry.
Figure 8B:
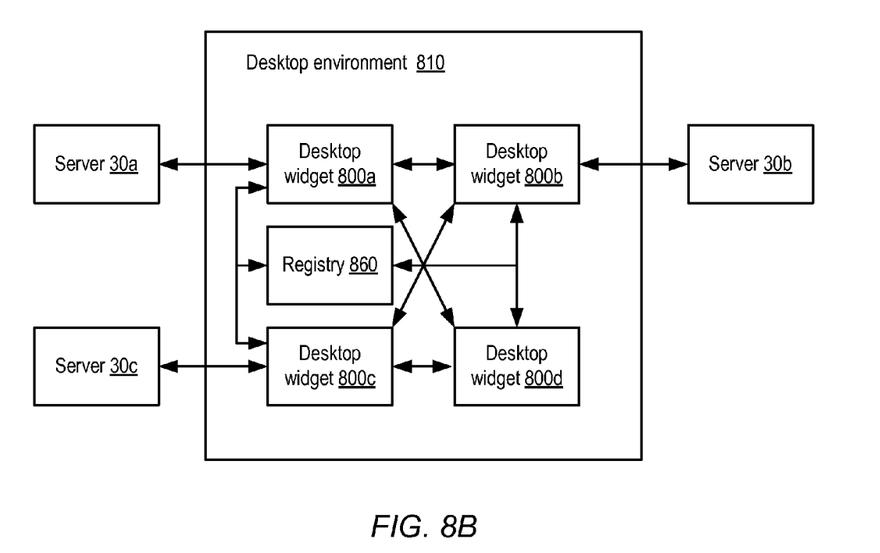

Example embodiments of such configurations are illustrated in FIGS. 8A-B. In FIG. 8A, a number of desktop widgets 800a-d are shown within a desktop environment 810 of a client 10. Generally speaking, desktop widgets 800 may share the same basic features as widgets 200 described above, except that desktop widgets 800 need not rely on a browser 210 to function. Desktop environment 810 may generally correspond to an application execution environment provided by an operating system executed by client 10.

As shown, desktop widgets 800a-c may be configured to communicate with corresponding servers 30a-c. For example, desktop widgets 800a-c may be configured to employ web-based protocols, such as HTTP, for example, to request content from servers 30a-c via a network (not shown in FIG. 8A). In the illustrated embodiment, desktop widget 800d may be configured in a standalone fashion. That is, it may execute within client 10 without communicating with external server 30 or other clients 10.

Each of desktop widgets 800a-d may be further configured to communicate with one another via message bus 850. In the illustrated embodiment, message bus 850 may correspond in features and functionality to message bus 300 described above, except that message bus 850 may be appropriately configured to operate without dependence on a browser 210. For example, message bus 850 may be implemented using calling conventions that are appropriate for desktop environment 810. In one embodiment, message bus 850 may be configured to support the same types of functionality as implemented by message bus 300. For example, message bus 850 may support registration of desktop widgets 800 and message broadcast communication among desktop widgets 800 in a manner similar to that described above with respect to FIGS. 4A-B.

FIG. 8B illustrates an example embodiment in which the desktop widget features described above with respect to FIG. 8A may be configured to communicate with the facilitation of a peer-to-peer registry. In the illustrated embodiment, desktop widgets 800a-d are shown within desktop environment 810 as before, with desktop widgets 800a-c configured to communicate with respective servers 30a-c and desktop widget 800d configured as a standalone widget. Rather than communicating via message bus 850, however, in the illustrated embodiment, desktop widgets 800a-d may be configured to communicate in a peer-to-peer fashion with one another via registry 860. In the illustrated embodiment, registry 860 may correspond in features and functionality to registry 500 described above, except that like message bus 850, registry 860 may be appropriately configured to operate without dependence on a browser 210. For example, registry 860 may be implemented using calling conventions that are appropriate for desktop environment 810. In one embodiment, registry 860 may be configured to support the same types of functionality as implemented by registry 500, described above. For example, registry 860 may support registration, notification and configuration of desktop widgets 800 in a manner similar to that described above with respect to FIGS. 6-7.

Thus, broadly speaking, the various techniques described above may be implemented to support client-side communication among desktop widgets 800, at least some of which are configured to communicate with corresponding servers 30 via web-based protocols. Such client-side communication, however, may be conducted entirely locally to client 10, without requiring that desktop widgets 800 communicate with any entity external to client 10. As with widgets 200 described above, such client-side communication among desktop widgets 800 may improve overall performance as perceived by the user of client 10, for example by reducing the latency of interaction among desktop widgets 800. In some embodiments, as with widgets 200 described above, such client-side communication techniques may further facilitate the local configuration and management of desktop widgets 800, allowing users to assemble a variety of such widgets 800 and configure them to communicate with one another to suit their own needs or preferences.

The various techniques described above with respect to either browser widgets 200 or desktop widgets 800 may allow a content provider, such as a web page or widget designer, to specify a given set of browser widgets 200 or desktop widgets 800 included with a default presentation of the provided content. These techniques may further allow a user of the content, via client 10, to substitute one or more other browser widgets 200 or desktop widgets 800 for members of the given set of widgets included with the default presentation, according to the user's preferences. For example, as described above, if a user isn't satisfied with the capabilities of a default widget, that user may obtain a different widget from another source or may develop one (e.g., by coding a different widget from scratch or by composing other, simpler widgets to create a more sophisticated widget).

In some embodiments, a content provider may wish to limit the degree to which a user may customize widgets within client 10. For example, in order to preserve the integrity of the user experience or the security of data, a content provider may wish to ensure that any widget that a user seeks to substitute for a provided widget satisfies various constraints for minimum levels of functionality, security or other features. Correspondingly, in some embodiments, a content provider may specify such constraints or requirements as part of the content, and message bus 300 or registry 500 may be configured to enforce such constraints, e.g., as part of the widget registration process. For example, a content provider may specify that any widget substituted for the one provided should support at least a minimum level of interface functionality, and may enumerate the characteristics of the required interface (e.g., that the widget should be capable of generating and/or receiving certain types of messages). A content provider may alternatively or additionally specify that any substitute widget should be authenticated in some fashion, e.g., by a third party.

Exemplary Computer System

It is contemplated that in some embodiments, any of the methods, techniques or components described above may be implemented as instructions and data capable of being stored or conveyed via a computer-accessible medium. Such methods or techniques may include, for example and without limitation, the various methods of registering widgets 200 and implementing communication among them described above. Also, the widgets 200 themselves, message bus 300 and/or registry 500 may be implemented as executable instructions stored on a computer-accessible medium. Such instructions may be executed to perform a particular computational function, such as implementing message passing, mathematical functions such as integration, differentiation, convolution, etc., as well as higher-order functions such as operating system functionality, network communications functionality, application functionality, and/or any other suitable functions.

Figure 9:
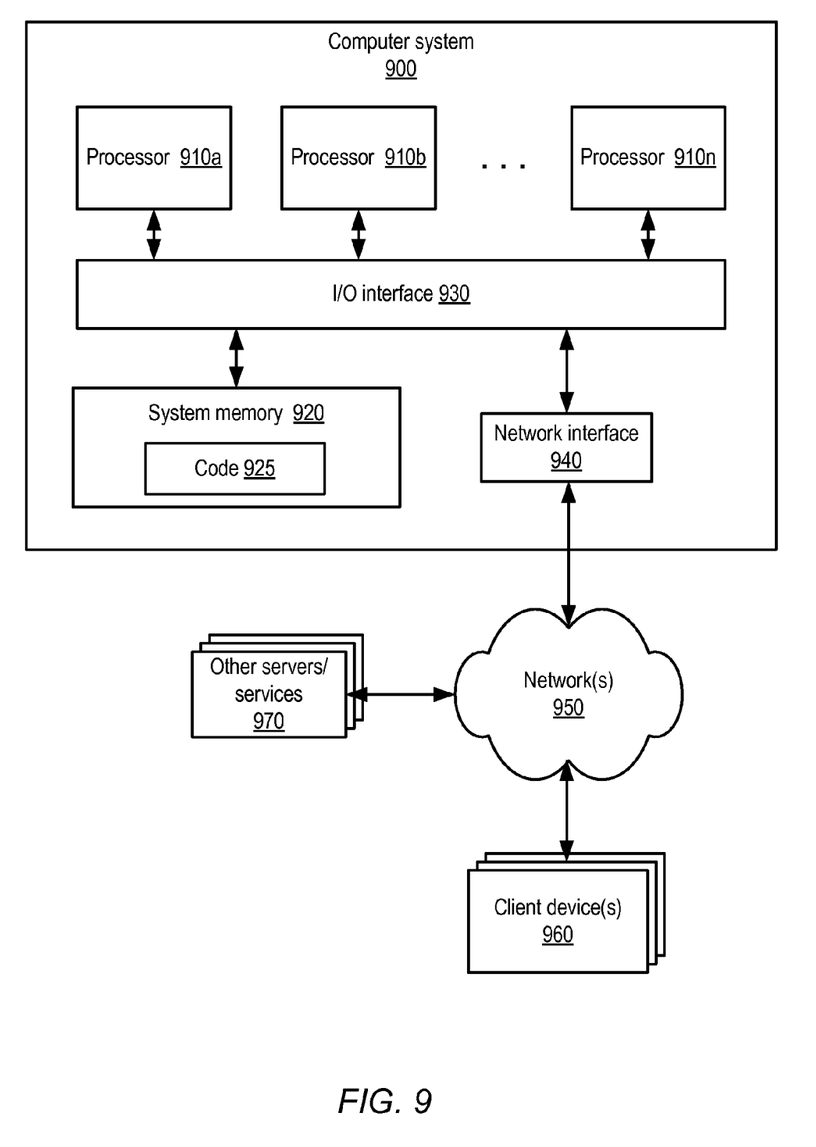
FIG. 9 is a block diagram illustrating an exemplary embodiment of a computer system.

One exemplary embodiment of a computer system including tangible, computer-accessible storage media is illustrated in FIG. 9. Such a system may also be referred to as a node or computing node. In the illustrated embodiment, computer system 900 includes one or more processors 910 coupled to a system memory 920 via an input/output (I/O) interface 930. Computer system 900 further includes a network interface 940 coupled to I/O interface 930. In different embodiments, system 900 may be variously configured as a server system, a desktop or notebook system, an embedded system, a handheld or portable client system, etc. In various embodiments, any of clients 10 and/or servers 30 may correspond to one or more instances of computer system 900, though in some cases, the system configurations employed for clients 10 may differ from those provided for servers 30.

In various embodiments, computer system 900 may be a uniprocessor system including one processor 910, or a multiprocessor system including several processors 910 (e.g., two, four, eight, or another suitable number). Processors 910 may be any suitable processor capable of executing instructions. For example, in various embodiments processors 910 may be a general-purpose or embedded processor implementing any of a variety of instruction set architectures (ISAs), such as the x86, PowerPC, SPARC, or MIPS ISAs, or any other suitable ISA. In multiprocessor systems, each of processors 910 may commonly, but not necessarily, implement the same ISA.

System memory 920 may be configured to store instructions and data accessible by processor 910. In various embodiments, system memory 920 may be implemented using any suitable memory technology, such as static random access memory (SRAM), synchronous dynamic RAM (SDRAM), nonvolatile/Flash-type memory, or any other type of memory. In the illustrated embodiment, instructions and data implementing desired functions, methods or techniques, such as those described above, are shown stored within system memory 920 as code 925. It is noted that in some embodiments, code 925 may include instructions and data implementing desired functions that are not directly executable by processor 910 but are represented or encoded in an abstract form that is translatable to instructions that are directly executable by processor 910. For example, code 925 may include instructions specified in an ISA that may be emulated by processor 910, or by other code 925 executable on processor 910. Alternatively, code 925 may include instructions, procedures or statements implemented in an abstract programming language that may be compiled or interpreted in the course of execution. As non-limiting examples, code 925 may include code specified in a procedural or object-oriented programming language such as C or C++, a scripting language such as perl, a markup language such as HTML or XML, or any other suitable language.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices attached to a network 950, such as other computer systems or communications devices, for example. In particular, network interface 940 may be configured to allow communication between computer system 900 and client devices 960 and/or other servers/services 970 through various communications channels via network(s) 950. These client devices 960 may include various computing and communications devices, which may include elements similar to those of computer system 900. For example, where computer system 900 corresponds to a server 30, client devices 960 may correspond to instances of clients 10. In embodiments where computer system corresponds to a client 10, it may or may not be configured to communicate with other clients 10 as client devices 960. For example, a client configuration of system 900 may be implemented to allow peer-to-peer communication among clients 10 as well as communication with one or more servers 30.

The communications channels supported by network(s) 950 may include, but are not limited to conventional and mobile telephone and text messaging communications channels. Network interface 940 may commonly support one or more wireless networking protocols (e.g., Wi-Fi/IEEE 802.11, or another wireless networking standard). However, in various embodiments, network interface 940 may support communication via any suitable wired or wireless general data networks, such as other types of Ethernet network, for example. Additionally, network interface 940 may support communication via telecommunications/telephony networks such as analog voice networks or digital fiber communications networks, via storage area networks such as Fibre Channel SANs, or via any other suitable type of network and/or protocol.

In some embodiments, system memory 920 may be one embodiment of a tangible, computer-accessible storage medium configured to store instructions and data as described above. However, in other embodiments, instructions and/or data may be stored upon and retrieved from different types of computer-accessible storage media. Generally speaking, a computer-accessible medium may include storage media or memory media such as magnetic or optical media, e.g., disk or CD/DVD-ROM coupled to computer system 900 via I/O interface 930. A computer-accessible medium may also include any volatile or non-volatile media such as RAM (e.g. SDRAM, DDR SDRAM, RDRAM, SRAM, etc.), ROM, etc, that may be included in some embodiments of computer system 900 as system memory 920 or another type of memory. A computer-accessible medium may generally be accessible via transmission media or signals such as electrical, electromagnetic, or digital signals, conveyed via a communication medium such as a network and/or a wireless link, such as may be implemented via network interface 940.

It is noted that the various methods illustrated in the figures and described above represent exemplary embodiments of methods. These methods may be implemented in software, hardware or any suitable combination thereof. Where suitable, the order of operation of method elements is not restricted to the order described or shown, and in other embodiments various method elements may be performed in a different order. It is also contemplated that in various embodiments, not all method elements need be performed, and existing method elements may be modified or additional elements added.

Although the embodiments above have been described in considerable detail, numerous variations and modifications will become apparent to those skilled in the art once the above disclosure is fully appreciated. It is intended that the following claims be interpreted to embrace all such variations and modifications. Accordingly, the above description is to be regarded in an illustrative rather than a restrictive sense.

What is claimed is:

1. A system, comprising:
a memory configured to store instructions; and
one or more processors coupled to said memory,
wherein said instructions when executed by at least one of said one or more processors implement a web browser and a plurality of widgets configured to execute within an execution environment provided by said web browser;
wherein said web browser is configured to obtain content from servers external to said system and is further configured to maintain a browser content model that is representative of said content;
wherein members of at least a subset of said plurality of widgets are configured to communicate with one another without interacting with any of said servers external to said system, and wherein said members are further configured to communicate with one another without dependence on said browser content model;
wherein said instructions when executed implement a message bus configured to receive a message from a given member of said at least a subset of said plurality of widgets and to broadcast said message to other members of said at least a subset of said plurality of widgets; and
wherein delivery of said message from said given member to said other members of said at least a subset of said widgets occurs without interaction with any of said servers external to said system.

2. The system as recited in claim 1, wherein said message bus is further configured to implement a registration interface, and wherein prior to conveying said message to said message bus, said given member is further configured to register itself with said message bus via said registration interface.

3. The system as recited in claim 2, wherein said message bus is further configured to broadcast said message to said other members of said at least a subset of said widgets dependent upon whether said other members were previously registered via said registration interface.

4. The system as recited in claim 1, wherein said message is formatted according to one of more of Hypertext Markup Language (HTML), eXtensible Markup Language (XML) or Javascript Object Notation (JSON).

5. The system as recited in claim 1, wherein said message includes header information identifying contents of said message, and wherein upon receiving said message from said message bus, a particular one of said at least a subset of said widgets is configured to process said message dependent upon said header information.

6. The system as recited in claim 1, wherein said message bus comprises one or more code modules within content rendered by said web browser.

7. The system as recited in claim 1, wherein said instructions when executed implement a registry, wherein said registry is configured to maintain a representation of interfaces of ones of said at least a subset of said widgets that have registered with said registry.

8. The system as recited in claim 7, wherein said representation comprises indications of nodes and edges, wherein said indications of nodes correspond respectively to registered ones of said at least a subset of said widgets, wherein said indications of edges correspond to respective pairs of said nodes including a respective source node and a respective destination node, and wherein each of said edges indicates a corresponding type of message capable of being transmitted from a source widget corresponding to said respective source node to a destination widget corresponding to said respective destination node.

9. The system as recited in claim 7, wherein to register with said registry, a given member of said at least a subset of said widgets is configured to convey a message to said registry indicating one or more types of messages said given member is configured to send or receive.

10. The system as recited in claim 9, wherein said message indicates said one or more types of messages according to a common message schema shared by said registry and said given member.

11. The system as recited in claim 9, wherein said message indicates said one or more types of messages according to a description language, wherein for a given one of said one or more types of messages, said description language enumerates one or more structural elements comprising said given type of message.

12. The system as recited in claim 7, wherein said registry is further configured to select two or more of said registered ones of said at least a subset of said widgets.

13. The system as recited in claim 12, wherein to select said two or more registered widgets, said registry is further configured to present said representation to a user via a user interface and to select said two or more registered widgets in response to said user indicating said two or more registered widgets via said user interface.

14. The system as recited in claim 12, wherein to select said two or more registered widgets, said registry is further configured to select said two or more registered widgets dependent upon said representation without input from a user.

15. The system as recited in claim 12, wherein in response to selecting said two or more registered widgets, said registry is further configured to convey a notification message to said two or more registered widgets.

16. The system as recited in claim 15, wherein subsequent to receiving said notification message, a particular one of said two or more registered widgets is configured to convey a message to another one of said two or more registered widgets dependent upon said notification message, wherein delivery of said message occurs without interaction with any of said servers external to said system.

17. The system as recited in claim 1, wherein said browser content model maintained by said web browser is compliant with one or more of Document Object Model (DOM) Levels 0, 1, 2 or 3.

18. The system as recited in claim 1, wherein ones of said plurality of widgets are implemented in Java™, Javascript, Flash™, C#, PHP, or perl programming languages.

19. The system as recited in claim 1, wherein a given one of said plurality of widgets is configured to communicate with a corresponding widget configured to execute on a different system.

20. The system as recited in claim 19, wherein said given widget is further configured to communicate with said corresponding widget without interacting with any of said servers external to said system.

21. The system as recited in claim 1, wherein to obtain said content, said web browser is further configured to retrieve default ones of said plurality of widgets from servers external to said system.

22. The system as recited in claim 21, wherein in response to detecting a user request, said web browser is further configured to substitute a different widget for a given default one of said plurality of widgets.

23. The system as recited in claim 22, wherein said web browser is further configured to substitute said different widget for said given default widget dependent upon whether said different widget satisfies a functionality constraint specified by a provider of said content.

24. The system as recited in claim 1, wherein said members of said at least a subset of said plurality of widgets are further configured to communicate with one another in a broadcast manner, such that a message sent by a given one of said members is directed to each other one of said members.

25. The system as recited in claim 1, wherein said members of said at least a subset of said plurality of widgets are further configured to communicate with one another in a peer-to-peer manner, such that a message sent by a given one of said members is targeted to a particular other one of said members.

26. A computer-implemented method, comprising:
a web browser executing on a system;
a plurality of widgets executing within an execution environment provided by said web browser;
said web browser obtaining content from servers external to said system;
said web browser maintaining a browser content model that is representative of said content;
members of at least a subset of said plurality of widgets communicating with one another without interacting with any of said servers external to said system and without dependence on said browser content model;
receiving, on a message bus on said system, a message from a given member of said at least a subset of said plurality of widgets; and
broadcasting said message to other members of said at least a subset of said plurality of widgets,
wherein delivery of said message from said given member to said other members of said at least a subset of said plurality of widgets occurs without interaction with any of said servers external to said system.

27. The computer-implemented method as recited in claim 26, further comprising:
prior to conveying said message to said message bus, said given member registering itself with said message bus via a registration interface provided by said message bus.

28. The computer-implemented method as recited in claim 27, further comprising said message bus broadcasting said message to said other members of said at least a subset of said widgets dependent upon whether said other members were previously registered via said registration interface.

29. The computer-implemented method as recited in claim 26, wherein said message is formatted according to one of more of Hypertext Markup Language (HTML), eXtensible Markup Language (XML) or Javascript Object Notation (JSON).

30. The computer-implemented method as recited in claim 26, wherein said message includes header information identifying contents of said message, and wherein the method further comprises:
upon receiving said message from said message bus, a particular one of said at least a subset of said widgets processing said message dependent upon said header information.

31. The computer-implemented method as recited in claim 26, further comprising a registry on said system maintaining a representation of interfaces of ones of said at least a subset of said widgets that have registered with said registry.

32. The computer-implemented method as recited in claim 31, wherein said representation comprises indications of nodes and edges, wherein said indications of nodes correspond respectively to registered ones of said at least a subset of said widgets, wherein said indications of edges correspond to respective pairs of said nodes including a respective source node and a respective destination node, and wherein each of said edges indicates a corresponding type of message capable of being transmitted from a source widget corresponding to said respective source node to a destination widget corresponding to said respective destination node.

33. The computer-implemented method as recited in claim 31, further comprising a given member of said at least a subset of said widgets registering with said registry, wherein said given member of said at least a subset of said widgets registering comprises conveying a message to said registry indicating one or more types of messages said given member is configured to send or receive.

34. The computer-implemented method as recited in claim 33, wherein said message indicates said one or more types of messages according to a common message schema shared by said registry and said given member.

35. The computer-implemented method as recited in claim 33, wherein said message indicates said one or more types of messages according to a description language, wherein for a given one of said one or more types of messages, said description language enumerates one or more structural elements comprising said given type of message.

36. The computer-implemented method as recited in claim 31, further comprising said registry selecting two or more of said registered ones of said at least a subset of said widgets.

37. The computer-implemented method as recited in claim 36, wherein selecting said two or more registered widgets comprises said registry presenting said representation to a user via a user interface and selecting said two or more registered widgets in response to said user indicating said two or more registered widgets via said user interface.

38. The computer-implemented method as recited in claim 36, wherein said registry selecting said two or more registered widgets occurs dependent upon said representation without input from a user.

39. The computer-implemented method as recited in claim 36, further comprising:
in response to selecting said two or more registered widgets, said registry conveying a notification message to said two or more registered widgets.

40. The computer-implemented method as recited in claim 39, further comprising:
subsequent to receiving said notification message, a particular one of said two or more registered widgets conveying a message to another one of said two or more registered widgets dependent upon said notification message, wherein delivery of said message occurs without interaction with any of said servers external to said system.

41. The computer-implemented method as recited in claim 26, wherein said browser content model maintained by said web browser is compliant with one or more of Document Object Model (DOM) Levels 0, 1, 2 or 3.

42. The computer-implemented method as recited in claim 26, wherein ones of said plurality of widgets are implemented in Java™, Javascript, Flash™, C#, PHP, or perl programming languages.

43. The computer-implemented method as recited in claim 26, further comprising a given one of said plurality of widgets communicating with a corresponding widget configured to execute on a different system.

44. The computer-implemented method as recited in claim 43, further comprising said given widget communicating with said corresponding widget without interacting with any of said servers external to said system.

45. The computer-implemented method as recited in claim 26, wherein obtaining said content further comprises said web browser retrieving default ones of said plurality of widgets from servers external to said system.

46. The computer-implemented method as recited in claim 45, further comprising in response to detecting a user request, said web browser substituting a different widget for a given default one of said plurality of widgets.

47. The computer-implemented method as recited in claim 46, wherein said web browser substituting said different widget for said given default widget occurs dependent upon whether said different widget satisfies a functionality constraint specified by a provider of said content.

48. A system, comprising:
a memory configured to store instructions; and
one or more processors coupled to said memory,
wherein said instructions when executed by at least one of said one or more processors implement a desktop environment and a plurality of widgets configured to execute within said desktop environment without dependence on a web browser;
wherein a subset of said plurality of widgets are configured to obtain content from one or more servers external to said system;
wherein said plurality of widgets are configured to communicate with one another without interacting with any of said servers external to said system;
wherein said instructions when executed implement a message bus configured to receive a message from a given one of said plurality of widgets and to broadcast said message to other ones of said plurality of widgets; and
wherein delivery of said message from said given widget to said other ones of said plurality of widgets occurs without interaction with any of said servers external to said system.

49. The system as recited in claim 48, wherein members of said subset of said plurality of widgets are further configured to obtain content from said one or more servers according to Hypertext Transfer Protocol (HTTP).

50. The system as recited in claim 48, wherein said instructions when executed implement a registry, wherein said registry is configured to maintain a representation of interfaces of ones of said widgets that have registered with said registry.

51. A computer-implemented method, comprising:
a plurality of widgets executing within a desktop environment provided by a system, wherein said executing occurs without dependence on a web browser;
a subset of said plurality of widgets obtaining content from one or more servers external to said system;
said plurality of widgets communicating with one another without interacting with any of said servers external to said system; and
receiving, on a message bus executable on said system, a message from a given one of said plurality of widgets and broadcasting said message to other ones of said plurality of widgets,
wherein delivery of said message from said given widget to said other ones of said plurality of widgets occurs without interaction with any of said servers external to said system.

52. The computer-implemented method as recited in claim 51, further comprising members of said subset of said plurality of widgets obtaining content from said one or more servers according to Hypertext Transfer Protocol (HTTP).

53. The computer-implemented method as recited in claim 51, further comprising a registry on said system maintaining a representation of interfaces of ones of said widgets that have registered with said registry.

* * * * *